(12) United States Patent
Asahina et al.

(10) Patent No.: US 11,708,893 B2
(45) Date of Patent: Jul. 25, 2023

(54) SHIFT DEVICE FOR VEHICLE

(71) Applicant: KABUSHIKI KAISHA TOKAI-RIKA-DENKI-SEISAKUSHO, Aichi (JP)

(72) Inventors: Naomi Asahina, Aichi (JP); Yutaka Inamura, Aichi (JP); Kenji Nakanishi, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 25 days.

(21) Appl. No.: 16/641,887

(22) PCT Filed: Aug. 17, 2018

(86) PCT No.: PCT/JP2018/030566
§ 371 (c)(1),
(2) Date: Feb. 25, 2020

(87) PCT Pub. No.: WO2019/044550
PCT Pub. Date: Mar. 7, 2019

(65) Prior Publication Data
US 2020/0240514 A1    Jul. 30, 2020

(30) Foreign Application Priority Data

Sep. 4, 2017  (JP) .............................. JP2017-169722

(51) Int. Cl.
*F16H 59/08*    (2006.01)
*B60K 20/02*    (2006.01)
*F16H 59/02*    (2006.01)

(52) U.S. Cl.
CPC ............ *F16H 59/08* (2013.01); *B60K 20/02* (2013.01); *F16H 2059/0295* (2013.01); *F16H 2059/081* (2013.01)

(58) Field of Classification Search
CPC ................... F16H 59/08; F16H 59/105; F16H 2059/0295; F16H 2059/081; B60K 20/02;
(Continued)

(56) References Cited

U.S. PATENT DOCUMENTS 7,834,865 B2 * 11/2010 Jannasch .................. G05G 5/03
345/184
10,100,919 B1 * 10/2018 Turney ................ F16H 59/0278
(Continued)

FOREIGN PATENT DOCUMENTS

| FR | 3040927 A1 * | 3/2017 | ............. B60K 35/00 |
| JP | 2016-537232 A | 12/2016 | |
| JP | 2017114177 A * | 6/2017 | |

*Primary Examiner* — T. Scott Fix
(74) *Attorney, Agent, or Firm* — Thomas W. Cole; Calderon Safran & Cole P.C.

(57) ABSTRACT

A shift device for a vehicle includes: a shift body that is moved in a predetermined range in a first direction and in a second direction that is a direction opposite from the first direction, and whose shift position is changed; and a moving mechanism that has a moving member at which a first moving portion and a second moving portion are provided, the first moving portion moving the shift body in the first direction, and the second moving portion moving the shift body in the second direction, due to movement of the moving member.

12 Claims, 10 Drawing Sheets

(58) Field of Classification Search
CPC ...... B60K 2370/126; G05G 1/08; G05G 1/10; G05G 1/12
USPC ...................................................... 74/473.3
See application file for complete search history.

(56) References Cited

U.S. PATENT DOCUMENTS

| | | | |
|---|---|---|---|
| 2003/0029261 A1* | 2/2003 | DeJonge | B60K 37/06 74/335 |
| 2006/0037424 A1* | 2/2006 | Pickering | F16H 59/08 74/473.3 |
| 2008/0185272 A1* | 8/2008 | Otani | G06F 3/0362 200/318 |
| 2009/0000407 A1* | 1/2009 | Meyer | F16H 59/08 74/10.1 |
| 2009/0000413 A1* | 1/2009 | Furhoff | F16H 59/105 74/473.3 |
| 2009/0107287 A1* | 4/2009 | Seki | F16H 61/22 74/504 |
| 2015/0152958 A1* | 6/2015 | Watanabe | F16H 61/22 74/473.12 |
| 2015/0251534 A1* | 9/2015 | Kim | F16H 59/08 180/333 |
| 2016/0017983 A1* | 1/2016 | Levesque | F16H 61/24 74/473.25 |
| 2016/0138704 A1* | 5/2016 | Watanabe | G05G 5/08 74/473.23 |
| 2016/0245403 A1 | 8/2016 | Rake et al. | |
| 2020/0191259 A1* | 6/2020 | Bagley | F16H 59/02 |

\* cited by examiner

SHIFT DEVICE FOR VEHICLE

CROSS-REFERENCE TO RELATED APPLICATIONS

The present application is a U.S. National Phase of PCT/JP2018/030566 filed on Aug. 17, 2018, claiming priority under 35 USC 119 from Japanese Patent Application No. 2017-169722 filed Sep. 4, 2017, the disclosure of which is incorporated by reference herein.

BACKGROUND ART

In a shift device disclosed in Japanese Patent Application National Publication No. 2016-537232, due to an adjusting ring being rotated in one direction, the nose of the adjusting ring rotates an operation element in one direction.

TECHNICAL FIELD

The present invention relates to a shift device for a vehicle in which a shift body is moved, and a shift position is changed.

In such a shift device, it is preferable to be able to rotate the operation element in one direction and in another direction.

SUMMARY OF INVENTION

Technical Problem

In view of the above-described circumstances, the present disclosure provides a shift device that can move a shift body in one direction and in another direction.

Solution to Problem

A shift device for a vehicle of a first aspect of the present disclosure includes: a shift body that is moved in a predetermined range in a first direction and in a second direction that is a direction opposite from the first direction, and whose shift position is changed; and a moving mechanism that has a moving member at which a first moving portion and a second moving portion are provided, the first moving portion moving the shift body in the first direction, and the second moving portion moving the shift body in the second direction, due to movement of the moving member.

A shift device for a vehicle of a second aspect of the present disclosure includes, in the shift device of the first aspect: a first moved portion that is provided at the shift body, and that is moved in the first direction by the first moving portion; and a second moved portion that is provided at the shift body, and that is moved in the second direction by the second moving portion, wherein the first moving portion and the second moving portion, which are apart from one another, are disposed between the first moved portion and the second moved portion.

In a shift device for a vehicle of a third aspect of the present disclosure, in the shift device of the first aspect or the second aspect, due to the moving member being disposed at a reference position in a case in which the moving member is not moved, the shift body does not interfere with the first moving portion and the second moving portion in a case in which the shift body is moved in the predetermined range.

In a shift device for a vehicle of a fourth aspect of the present disclosure, in the shift device of the third aspect, the moving member is moved to the reference position between a case in which the first moving portion moves the shift body in the first direction, and a case in which the second moving portion moves the shift body in the second direction.

A shift device for a vehicle of a fifth aspect of the present disclosure comprises, in the shift device of any one of the first aspect through the fourth aspect: an urging member for urging the shift body; a first releasing portion that is provided at the moving member, and that, in a case in which the first moving portion moves the shift body in the first direction, releases urging of the shift body by the urging member; and a second releasing portion that is provided at the moving member, and that, in a case in which the second moving portion moves the shift body in the second direction, releases urging of the shift body by the urging member.

In a shift device for a vehicle of a sixth aspect of the present disclosure, in the shift device of the fifth aspect, before the first moving portion moves the shift body in the first direction, the first releasing portion starts releasing of the urging of the shift body by the urging member, and, before the second moving portion moves the shift body in the second direction, the second releasing portion starts releasing of the urging of the shift body by the urging member.

In a shift device for a vehicle of a seventh aspect of the present disclosure, in the shift device of the fifth aspect or the sixth aspect, positions of the first moving portion and the second releasing portion in a moving direction of the moving member overlap, and positions of the second moving portion and the first releasing portion in the moving direction of the moving member overlap.

In the shift device for a vehicle of the first aspect of the present disclosure, the shift body is moved in a predetermined range in the first direction and the second direction, and the shift position is changed.

Due to the moving mechanism moving the moving member, the first moving portion of the moving member moves the shift body in the first direction, and the second moving portion of the moving member moves the shift body in the second direction. Therefore, the shift body can be moved in the first direction and the second direction.

In the shift device for a vehicle of the second aspect of the present disclosure, the first moving portion and the second moving portion of the moving member are disposed between the first moved portion and the second moved portion of the shift body. The first moved portion of the shift body is moved in the first direction by the first moving portion of the moving member, and the second moved portion of the shift body is moved in the second direction by the second moving portion of the moving member.

The first moving portion and the second moving portion are apart from one another. Therefore, due to the first moved portion and the first moving portion being set near one another, and the second moved portion and the second moving portion being set near one another, the first moving portion can move the first moved portion in the first direction at an early stage, and the second moving portion can move the second moved portion in the second direction at an early stage.

In the shift device for a vehicle of the third aspect of the present disclosure, due to the moving member being disposed at the reference position in a case in which the moving member is not being moved, the shift body does not interfere with the first moving portion and the second moving portion of the moving member in a case in which the shift body is moved in the predetermined range. Therefore, the shift body applying a load to the moving mechanism can be suppressed.

In the shift device for a vehicle of the fourth aspect of the present disclosure, the moving member is moved to the reference position between a case in which the first moving portion of the moving member moves the shift body in the first direction, and a case in which the second moving portion of the moving member moves the shift body in the second direction. Therefore, after one of the first moving portion and the second moving portion moves the shift body in one of the first direction and the second direction, at the time when the moving member is moved in the another of the first direction and the second direction, the another of the first moving portion and the second moving portion can move the shift body in the another of the first direction and the second direction at an early stage.

In the shift device for a vehicle of the fifth aspect of the present disclosure, the urging member urges the shift body.

In a case in which the first moving portion of the moving member moves the shift body in the first direction, the first releasing portion of the moving member releases the urging of the shift body by the urging means. In a case in which the second moving portion of the moving member moves the shift body in the second direction, the second releasing portion of the moving member releases the urging of the shift body by the urging member. Therefore, the moving member moving the shift body in the first direction and in the second direction against the urging of the shift body by the urging means can be prevented.

In the shift device for a vehicle of the sixth aspect of the present disclosure, before the first moving portion of the moving member moves the shift body in the first direction, the first releasing portion of the moving member starts the releasing of the urging of the shift body by the urging means. Before the second moving portion of the moving member moves the shift body in the second direction, the second releasing portion of the moving member starts the releasing of the urging of the shift body by the urging means. Therefore, the moving member moving the shift body in the first direction and the second direction against the urging of the shift body by the urging means can be effectively prevented.

In the shift device for a vehicle of the seventh aspect of the present disclosure, the positions of the first moving portion and the second releasing portion in the moving direction of the moving member overlap, and the positions of the second moving portion and the first releasing portion in the moving direction of the moving member overlap. Therefore, the first moving portion and the second releasing portion can reinforce one another, and the second moving portion and the first releasing portion can reinforce one another.

BRIEF DESCRIPTION OF DRAWINGS

FIG. 5A shows a time when a knob is rotatingly operated to a "P" position, FIG. 5B shows a time when the knob is rotatingly operated to an "R" position, FIG. 5C shows a time when the knob is rotatingly operated to an "N" position, FIG. 5D shows a time when the knob is rotatingly operated to a "D" position, and FIG. 5E shows a time when the knob is rotatingly operated to an "M" position.

FIG. 6A shows a state of the start of driving of the knob.

DESCRIPTION OF EMBODIMENTS

Figure 1:
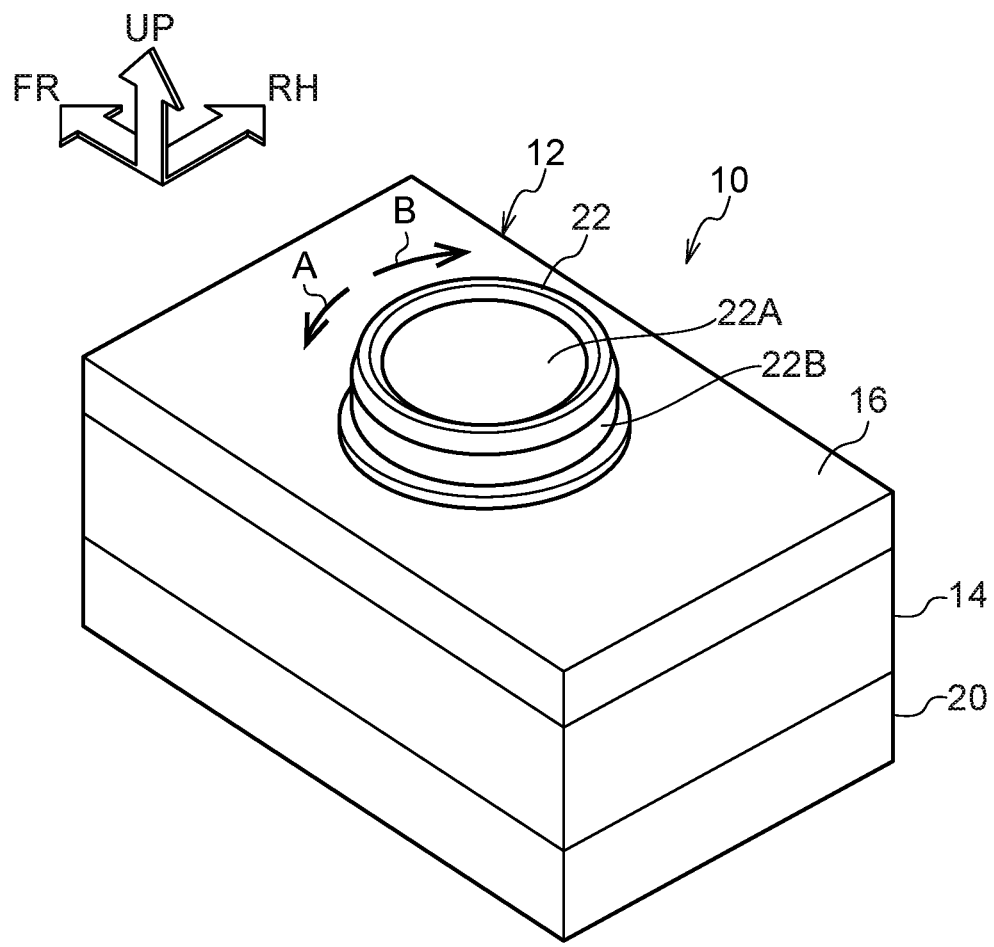
FIG. 1 is a perspective view that is seen from an obliquely left rear side, and shows a shift device relating to an embodiment of the present invention.
Figure 2:
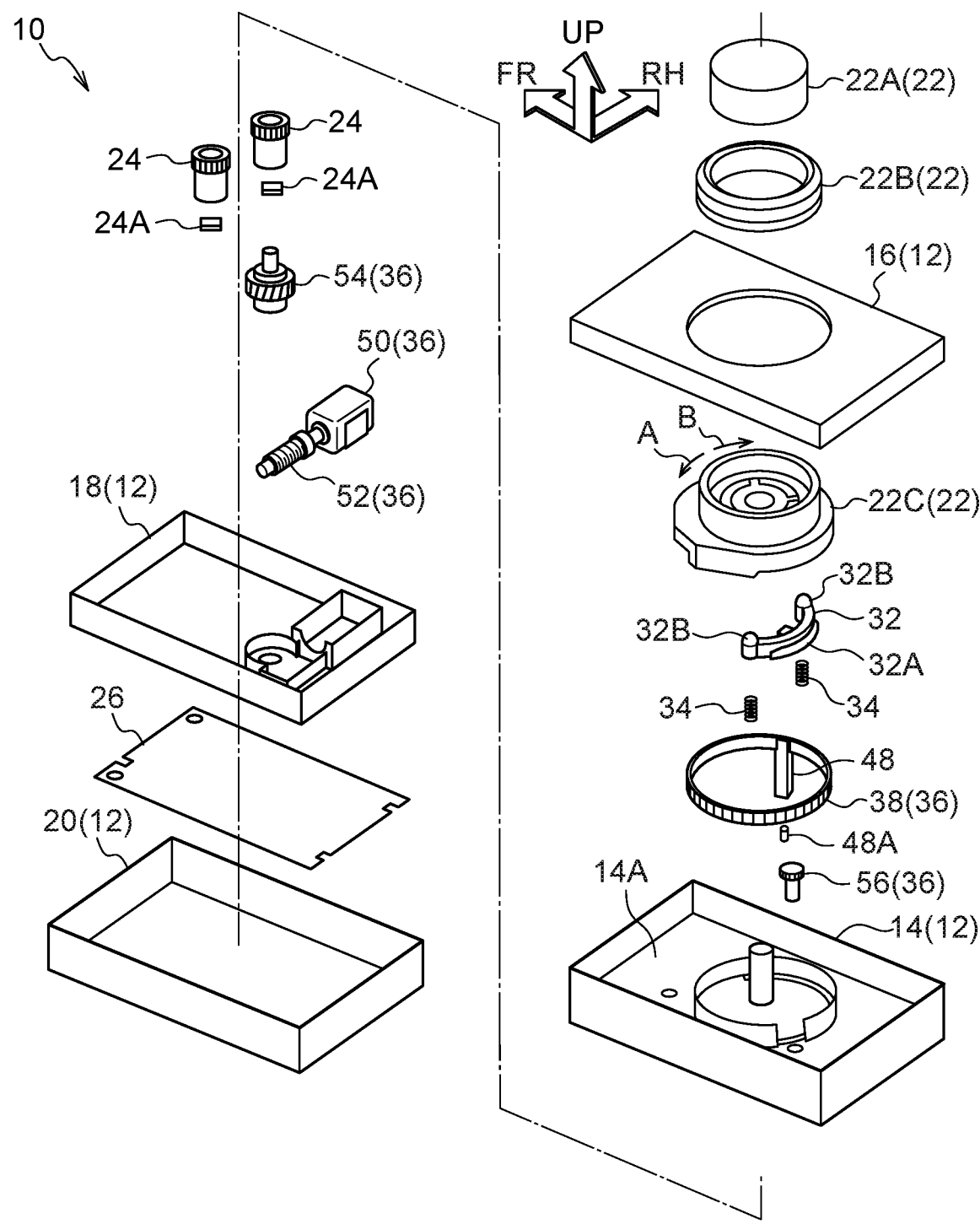
FIG. 2 is an exploded perspective view that is seen from an obliquely left rear side, and shows the shift device relating to the embodiment of the present invention.

A shift device 10 relating to an embodiment of the present invention is illustrated in FIG. 1 in a perspective view seen from an obliquely left rear side. The shift device 10 is shown in FIG. 2 in an exploded perspective view seen from an obliquely left rear side. Note that, in the drawings, a front side of the shift device 10 is denoted by arrow FR, a right side of the shift device 10 is denoted by arrow RH, and an upper side of the shift device 10 is denoted by arrow UP.

The shift device 10 relating to the present embodiment is a so-called by-wire type device. The shift device 10 is set at a console (not illustrated) of a vehicle (an automobile), and is disposed at a vehicle front side and an inner side in a vehicle transverse direction of a driver's seat (not illustrated) of the vehicle. The front side, right side and upper side of the shift device 10 coincide with the front side, the right side and the upper side of the vehicle, respectively.

As shown in FIG. 1 and FIG. 2, a supporting body 12 is provided at the shift device 10. The supporting body 12 is fixed to an interior of the console.

A plate 14, which is substantially shaped as a rectangular parallelepiped box and serves as a first supporting member, is provided at the supporting body 12. An upper surface and a lower surface of the plate 14 are open. A supporting plate 14A that is substantially rectangular plate shaped is provided at an interior of the plate 14. The supporting plate 14A partitions the interior of the plate 14 into an upper side portion and a lower side portion. A cover 16, which is substantially shaped as a rectangular parallelepiped box and serves as a covering member, is provided at the supporting body 12 at an upper side of the plate 14. A lower surface of the cover 16 is open. An outer periphery of the cover 16 is fit-together with an outer periphery of the plate 14, and the cover 16 covers an upper side portion of the interior of the plate 14.

A motor case 18, which is substantially shaped as a rectangular parallelepiped box and serves as a second supporting member, is provided at the supporting body 12 at the lower side of the plate 14. An upper surface of the motor case 18 is open. An upper side portion of the motor case 18 is fit-together with the lower side portion of the interior of the plate 14. The upper side of the motor case 18 is covered by the supporting plate 14A of the plate 14. A case 20, which is substantially shaped as a rectangular parallelepiped box and serves as a housing member, is provided at the supporting body 12 at a lower side of the motor case 18. An upper surface of the case 20 is open. A lower side portion of the motor case 18 is fit-together with an interior of the case 20, and an outer periphery of the case 20 is fit-together with the outer periphery of the plate 14.

A knob 22, which is substantially solid cylindrical and serves as a shift body (operation body), is supported at the interior of the plate 14 at the upper side of the supporting plate 14A. The knob 22 can rotate (move) around the vertical direction. The knob 22 can rotate in a predetermined range in a first direction (an arrow A direction in FIG. 1 and the like) and in a second direction (an arrow B direction in FIG. 1 and the like) that is the direction opposite from the first direction. The knob 22 can be disposed at a "P" position (parking position) that serves as a shift position (a predetermined shift position), an "R" position (reverse position) that serves as a shift position (a first shift position), an "N" position (neutral position) that serves as a shift position, a "D" position (drive position) that serves as a shift position (a second shift position), and an "M" position (manual position) that serves as a shift position, in that order from the first direction side toward the second direction side (refer to FIGS. 5A through 5E).

A first knob 22A that is substantially solid cylindrical and a second knob 22B that is substantially shaped as a cylindrical tube, which respectively structure an operation member, are provided coaxially at an upper side portion of the knob 22. The first knob 22A is fit-together with the interior of the second knob 22B, and the first knob 22A and the second knob 22B can rotate integrally. The first knob 22A and the second knob 22B pass-through the upper wall of the cover 16 of the supporting body 12 and the console so as to be rotatable, and project-out into the vehicle cabin. The first knob 22A and the second knob 22B are rotatingly operated by a vehicle occupant, and the knob 22 is rotatingly operated.

A knob base 22C, which is substantially shaped as a cylindrical tube and serves as a shift main body, is provided coaxially at a lower side portion of the knob 22. The knob base 22C can rotate integrally with the first knob 22A and the second knob 22B. A pair of sensing gears 24 that serve as a shift detecting means mesh-together with an interior of the lower portion of the knob base 22C. The pair of sensing gears 24 are supported in a state of being passed-through the supporting plate 14A. The pair of sensing gears 24 can rotate around the vertical direction. The knob 22 is rotated, and the pair of sensing gears 24 is rotated. Shift magnets 24A are respectively provided at lower ends of the pair of sensing gears 24 so as to be rotatable integrally therewith. A printed circuit board 26 that serves as a detecting means is fixed to an interior of the case 20. The printed circuit board 26 detects magnetic forces of the shift magnets 24A at the pair of sensing gears 24. Due to rotated positions of the pair of sensing gears 24 being detected, rotated position of the knob 22 is detected, and the shift position of the knob 22 is detected.

Figure 3:
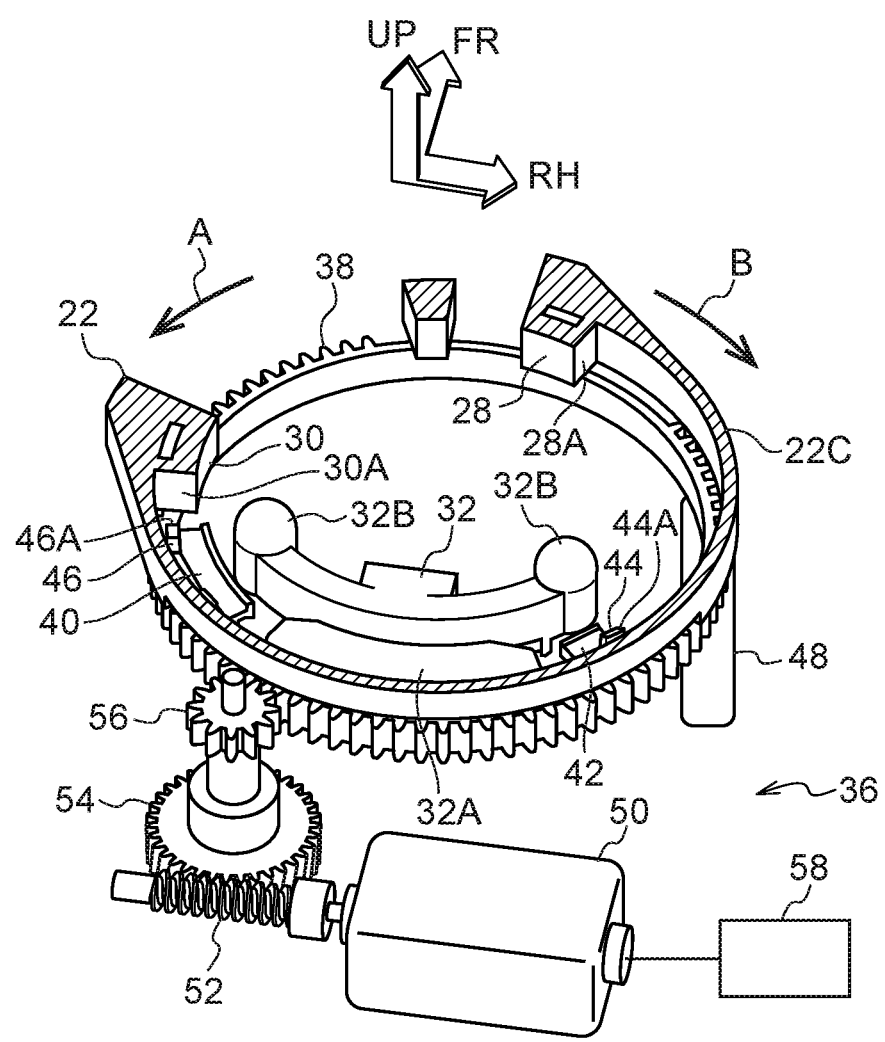
FIG. 3 is a perspective view that is seen from an obliquely right rear side, and shows main portions of the shift device relating to the embodiment of the present invention.
Figure 4:
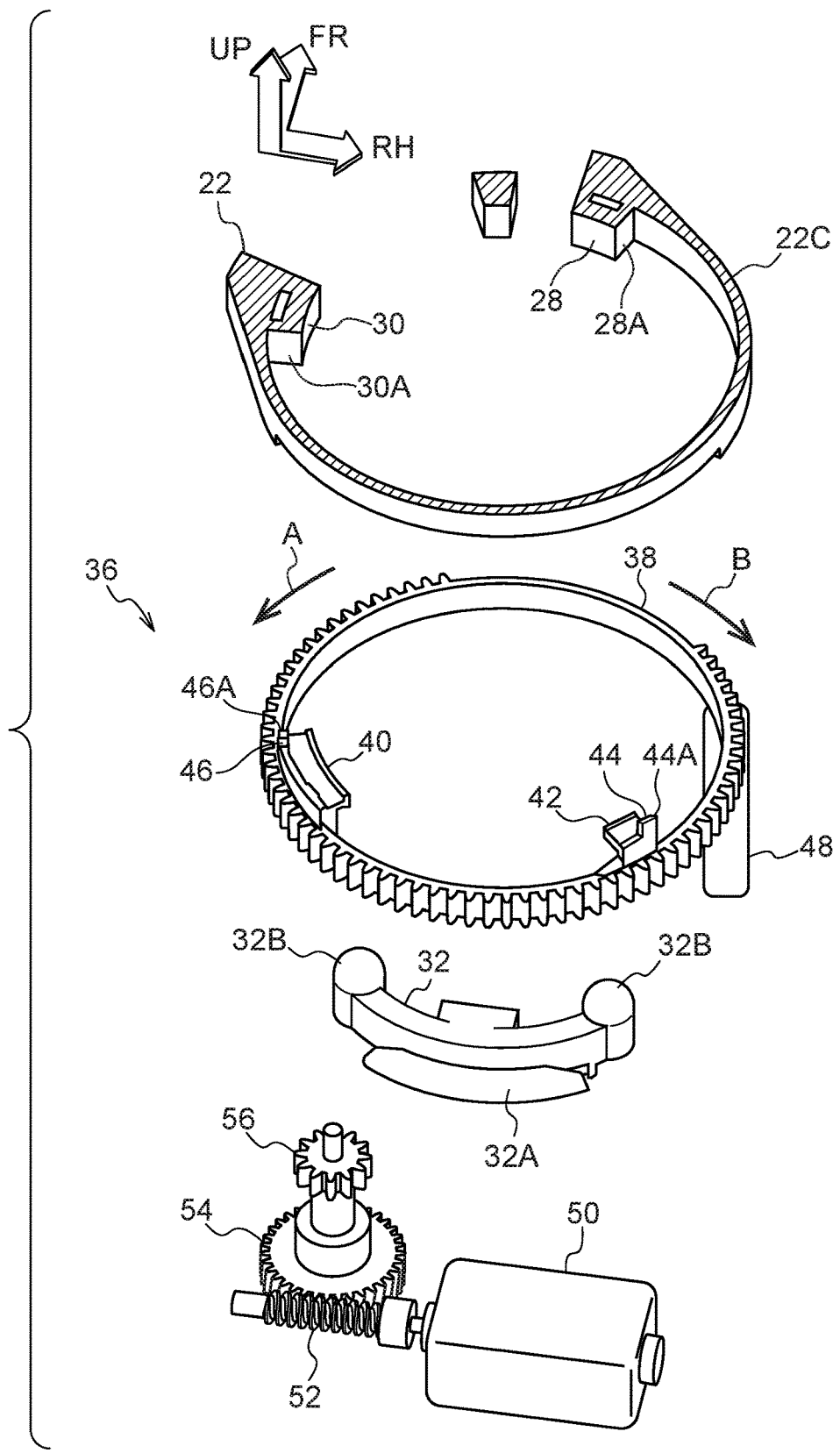
FIG. 4 is an exploded perspective view that is seen from an obliquely right rear side, and shows main portions of the shift device relating to the embodiment of the present invention.

As shown in FIG. 3 and FIG. 4, a first entrained portion 28 serving as a first moved portion and a second entrained portion 30 serving as a second moved portion are respectively formed at an outer peripheral portion of the lower end of the knob base 22C, at a right side portion and a left side portion of a front side of the knob base 22C. The first entrained portion 28 and the second entrained portion 30 project-out toward the lower side of the knob base 22C and a radial direction inner side of the knob 22. The first entrained portion 28 and the second entrained portion 30 are apart in a peripheral direction at the front side of the knob 22. A surface at the second direction side of the first entrained portion 28 is a first entrained surface 28A that serves as a first moved surface and a surface at the first direction side of the second entrained portion 30 is a second entrained surface 30A that serves as a second moved surface, respectively. The first entrained surface 28A and the second entrained surface 30A are disposed orthogonally to the peripheral direction of the knob 22.

A click surface (not illustrated) that serves as a click mechanism is formed at a lower surface, which is located at a rear side portion of the knob base 22C. Plural concave portions and convex portions (not illustrated) are respectively provided at the click surface. The concave portions and convex portions are disposed alternately and continuously in the peripheral direction of the knob 22. The concave portions and convex portions are curved in the peripheral direction of the knob 22.

A click body 32 that structures the click mechanism is provided at the rear side portion of the lower side of the knob base 22C. The click body 32 is supported at the upper side of the supporting plate 14A, so as to be movable in the vertical direction (see FIG. 2). The click body 32 extends in the peripheral direction of the knob 22, and a pushing plate 32A is formed at a rear side of the click body 32. The pushing plate 32A extends in the peripheral direction of the knob 22. Upper surfaces of both end portions in the extending direction of the pushing plate 32A are tilted in directions of heading toward the lower side while heading toward outer sides in the extending direction of the pushing plate 32A. Click pins 32B, which are substantially solid cylindrical and serve as click portions, are formed at the both end portions in the extending direction of the click body 32. The upper surfaces of the click pins 32B are curved in convex shapes, and project-out toward the upper side.

A pair of springs 34 (compression coil springs), which serve as an urging means and structure the click mechanism, are provided at the lower side of the click body 32. The springs 34 span between the supporting plate 14A and the click body 32, and urge the click body 32 toward the upper side (see FIG. 2). At the time when the knob 22 is disposed at the respective shift positions, due to the urging forces of the springs 34, the respective click pins 32B of the click body 32 enter into the concave portions of the click surface of the knob 22 (the lower surface of the knob base 22C), and the knob 22 is held at the respective shift positions. At the time when the knob 22 is rotatingly operated between the shift positions, due to the respective click pins 32B riding over the convex portions of the click surface against the urging forces of the springs 34, a clicking sensation is imparted to the rotational operation of the knob 22.

An entraining mechanism 36 that serves as a moving mechanism is provided at the lower side of the knob 22.

A rotor cam 38, which is annular and serves as a moving member (entraining member), is provided at the entraining mechanism 36. The rotor cam 38 is supported at the upper side of the supporting plate 14A so as to be rotatable around the vertical direction (see FIG. 2). The rotor cam 38 is disposed coaxially with the knob 22, and the rotated position of the rotor cam 38 is located at a reference position (a start position).

A first releasing portion 40 and a second releasing portion 42, which are respectively shaped as substantially L-shaped plates in cross-section, are formed at a left side portion and a right side portion at a rear side of the rotor cam 38. Lower side portions of the first releasing portion 40 and the second releasing portion 42 are made integral with an inner peripheral portion of the rotor cam 38, and upper side portions project-out toward a radial direction inner side of the rotor cam 38.

A first entraining portion 44, which is plate-shaped and serves as a first moving portion, is formed at an end portion at a first direction side of the second releasing portion 42, and a second entraining portion 46, which is plate-shaped and serves as a second moving portion, is formed at an end portion at a second direction side of the first releasing portion 40, respectively. The first entraining portion 44 and the second entraining portion 46 project-out toward the upper side, and are disposed orthogonally to the radial direction of the rotor cam 38. The first entraining portion 44 and the second entraining portion 46 are apart in the peripheral direction at the rear side of the rotor cam 38. A surface at a first direction side of the first entraining portion 44 is a first entraining surface 44A that serves as a first moving surface and a surface at a second direction side of the second entraining portion 46 is a second entraining surface 46A that serves as a second moving surface, respectively. The first entraining surface 44A and the second entraining surface 46A are disposed orthogonally to the peripheral direction of the rotor cam 38.

Figure 5A:
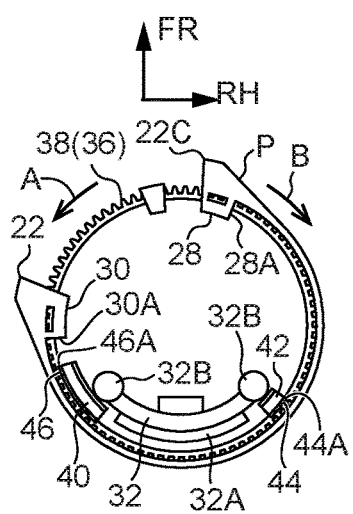
FIGS. 5A through 5E are plan views that are seen from above and that show main portions of the shift device relating to the embodiment of the present invention, where
Figure 5B:
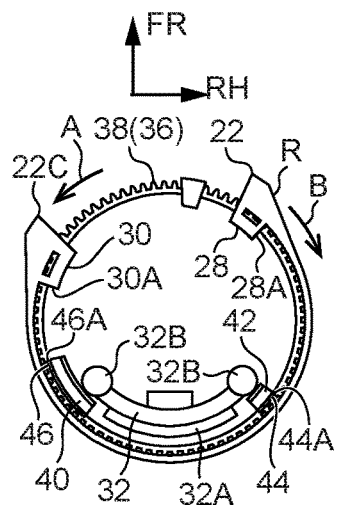
Figure 5C:
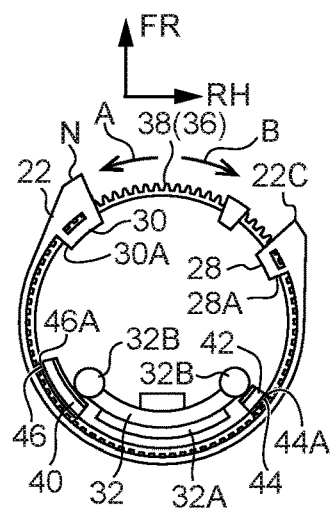
Figure 5D:
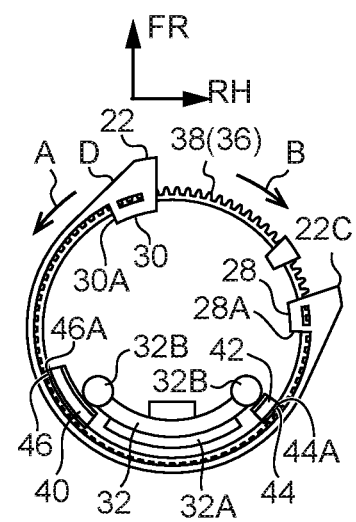
Figure 5E:
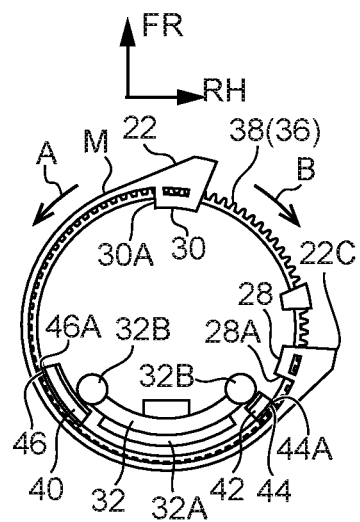

At the time when the knob 22 is disposed at the "P" position, the second entrained portion 30 (the second entrained surface 30A) of the knob 22 is apart from the second entraining portion 46 (the second entraining surface 46A) of the rotor cam 38, at a side in the second direction by a predetermined distance (a predetermined rotation angle of the knob 22 and the rotor cam 38) (see FIG. 5A). At the time when the knob 22 is disposed at the "M" position, the first entrained portion 28 (the first entrained surface 28A) of the knob 22 is apart from the first entraining portion 44 (the first entraining surface 44A) of the rotor cam 38, at a side in the first direction by a predetermined distance (a predetermined rotation angle of the knob 22 and the rotor cam 38) (see FIG. 5E). Therefore, at the time when the knob 22 is rotatingly operated, the first entrained portion 28 interfering with the first entraining portion 44 is restrained, and the second entrained portion 30 interfering with the second entraining portion 46 is restrained. Further, a clearance between the second entrained portion 30 and the second entraining portion 46 at the time when the knob 22 is disposed at the "P" position, and a clearance between the first entrained portion 28 and the first entraining portion 44 at the time when the knob 22 is disposed at the "M" position, are the same.

A detection pillar 48 is formed at a portion at the peripheral direction of the rotor cam 38. The detection pillar 48 can rotate integrally with the rotor cam 38. The detection pillar 48 projects-out downward and is passed-through the supporting plate 14A so as to be rotatable (see FIG. 2). A driving magnet 48A is fixed to a lower end of the detection pillar 48 (see FIG. 2). Due to the above-described printed circuit board 26 detecting a magnetic force of the driving magnet 48A, the rotated position of the detection pillar 48 is detected, and the rotated position of the rotor cam 38 is detected.

A motor 50 serving as a driving mechanism is provided at the entraining mechanism 36. The motor 50 is fixed to a rear side portion of the interior of the motor case 18. A worm gear 52 serving as an output gear is fixed coaxially to an output shaft of the motor 50. The worm gear 52 can rotate integrally with the output shaft of the motor 50. A helical gear 54 serving as a connecting gear meshes-together with the worm gear 52. The helical gear 54 is passed-through the supporting plate 14A so as to be rotatable around the vertical direction (see FIG. 2). An intermediate gear 56 (a spur gear) is fixed coaxially to an upper side of the helical gear 54. The intermediate gear 56 can rotate integrally with the helical gear 54. The intermediate gear 56 is meshed-together with an outer periphery of the rotor cam 38. Due to the motor 50 being driven, and the output shaft of the motor 50 being rotated, the worm gear 52, the helical gear 54 and the intermediate gear 56 are rotated, and the rotor cam 38 is rotatingly driven.

The above-described printed circuit board 26 and motor 50 are electrically connected to a control device 58 of the vehicle. The vehicle can be automatically parked by control of the control device 58.

Operation of the present embodiment is described next.

In the shift device 10 of the above-described structure, for example, in the state in which the knob 22 is disposed at the "P" position (the printed circuit board 26 detects that the knob 22 is disposed at the "P" position), and the vehicle is stopped, the control device 58 is operated by the vehicle occupant, and automatic parking of the vehicle by the control device 58 is started. In the automatic parking of the vehicle, for example, the knob 22 is disposed from the "P" position to the "D" position (the printed circuit board 26 detects that the knob 22 is disposed at the "D" position), and the vehicle is advanced forward, and, thereafter, the knob 22 is disposed from the "D" position to the "R" position (the printed circuit board 26 detects that the knob 22 is disposed at the "R" position), and the vehicle is moved rearward. Next, the knob 22 is disposed from the "R" position to the "D" position (the printed circuit board 26 detects that the knob 22 is disposed at the "D" position), and the vehicle is advanced forward, and, thereafter, the knob 22 is disposed from the "D" position to the "P" position (the printed circuit board 26 detects that the knob 22 is disposed at the "P" position), and the vehicle is stopped (parked), and the automatic parking of the vehicle is thereby finished.

Figure 6A:
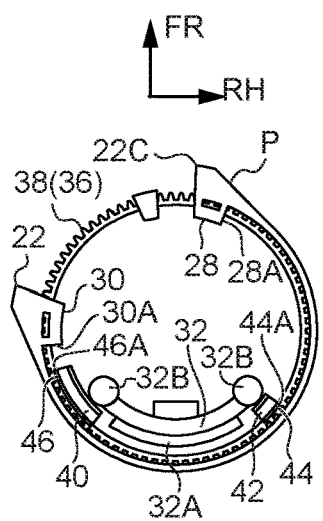
FIG. 6A though FIG. 6J are plan views that are seen from above and that show main portions of the shift device relating to the embodiment of the present invention, where
Figure 6B:
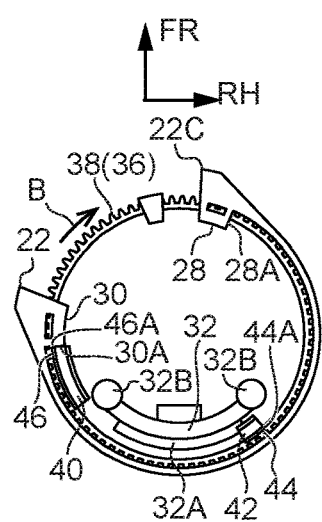
FIG. 6B shows a time when the knob is rotatingly driven from the "P" position in a second direction.
Figure 6C:
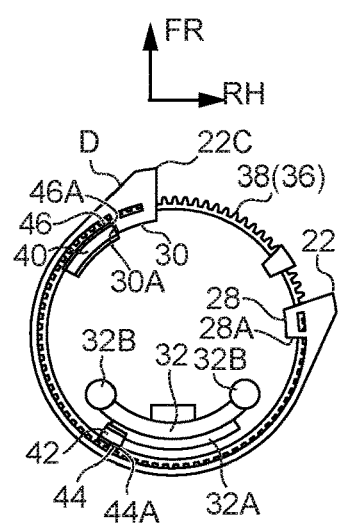
FIG. 6C shows a time when the knob is rotatingly driven from the "P" position to the "D" position.

At the time when the knob 22 is disposed from the "P" position to the "D" position, due to control of the control device 58, the motor 50 is driven reversely, and the rotor cam 38 is rotated in the second direction from the reference position. Due thereto, the second entraining portion 46 (the second entraining surface 46A) of the rotor cam 38 entrains (moves) the second entrained portion 30 (the second entrained surface 30A) of the knob 22 in the second direction, and the knob 22 is rotated to the "D" position (see FIG. 6A through FIG. 6C).

Immediately after the knob 22 reaches the "D" position (immediately after the printed circuit board 26 detects that the knob 22 is disposed at the "D" position), the motor 50 is driven forward, and the rotor cam 38 is rotated in the first direction. Due thereto, the rotor cam 38 is rotated to the reference position. At the time when the rotor cam 38 is disposed at the reference position (at the time when the printed circuit board 26 detects that the rotor cam 38 is disposed at the reference position), the forward driving of the motor 50 is stopped, and rotation of the rotor cam 38 in the first direction is stopped.

Figure 6D:
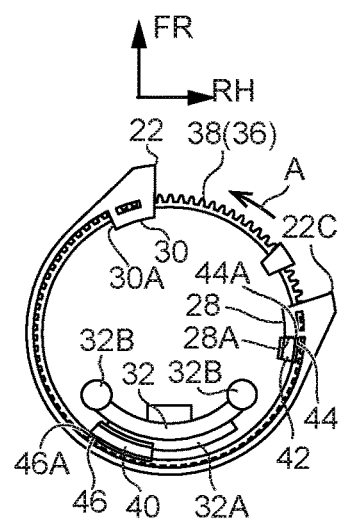
FIG. 6D shows a time when the knob is rotatingly driven from the "D" position in a first direction.
Figure 6E:
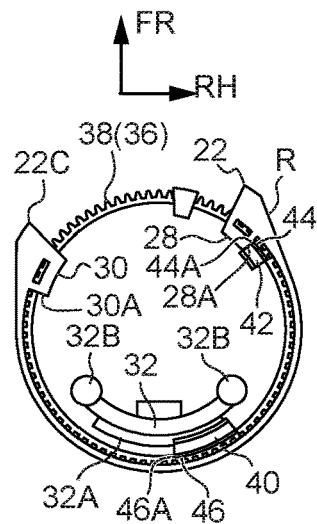
FIG. 6E shows a time when the knob is rotatingly driven from the "D" position to the "R" position.

At the time when the knob 22 is disposed from the "D" position to the "R" position, due to control of the control device 58, the motor 50 is driven forward, and the rotor cam 38 is rotated in the first direction from the refence position. Due thereto, the first entraining portion 44 (the first entraining surface 44A) of the rotor cam 38 entrains the first entrained portion 28 (the first entrained surface 28A) of the knob 22 in the first direction, and the knob 22 is rotated to the "R" position (refer to FIG. 6D and FIG. 6E).

Immediately after the knob 22 reaches the "R" position (immediately after the printed circuit board 26 detects that the knob 22 is disposed at the "R" position), the motor 50 is driven reversely, and the rotor cam 38 is rotated in the second direction. Due thereto, the rotor cam 38 is rotated to the reference position. At the time when the rotor cam 38 is disposed at the reference position (at the time when the printed circuit board 26 detects that the rotor cam 38 is disposed at the reference position), the reverse driving of the motor 50 is stopped, and rotation of the rotor cam 38 in the second direction is stopped.

Figure 6F:
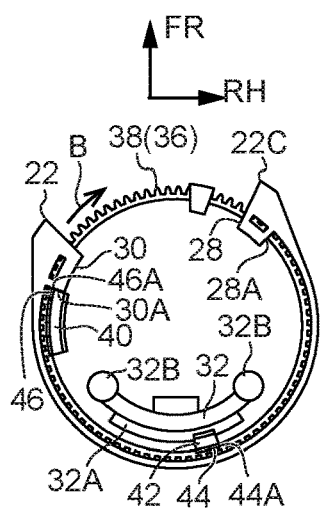
FIG. 6F shows a time when the knob is rotatingly driven from the "R" position in the second direction.
Figure 6G:
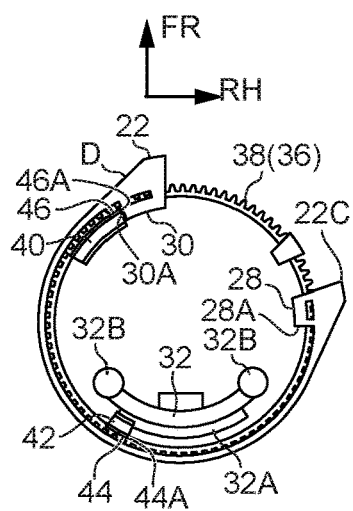
FIG. 6G shows a time when the knob is rotatingly driven from the "R" position to the "D" position.

At the time when the knob 22 is disposed from the "R" position to the "D" position, due to control of the control device 58, the motor 50 is driven reversely, and the rotor cam 38 is rotated in the second direction from the reference position. Due thereto, the second entraining portion 46 (the second entraining surface 46A) of the rotor cam 38 entrains the second entrained portion 30 (the second entrained surface 30A) of the knob 22 in the second direction, and the knob 22 is rotated to the "D" position (refer to FIG. 6F and FIG. 6G).

Immediately after the knob 22 reaches the "D" position (immediately after the printed circuit board 26 detects that the knob 22 is disposed at the "D" position), the motor 50 is driven forward, and the rotor cam 38 is rotated in the first direction. Due thereto, the rotor cam 38 is rotated to the reference position. At the time when the rotor cam 38 is disposed at the reference position (at the time when the printed circuit board 26 detects that the rotor cam 38 is disposed at the reference position), the forward driving of the motor 50 is stopped, and the rotation of the rotor cam 38 in the first direction is stopped.

Figure 6H:
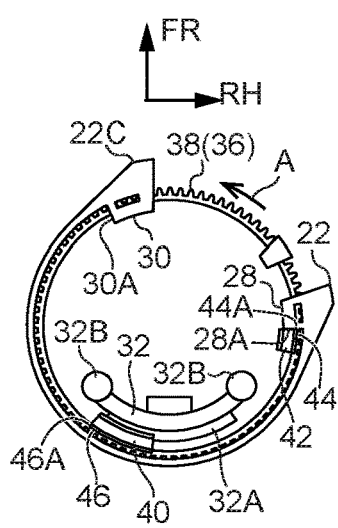
FIG. 6H shows a time when the knob is rotatingly driven from the "D" position in the first direction.
Figure 6I:
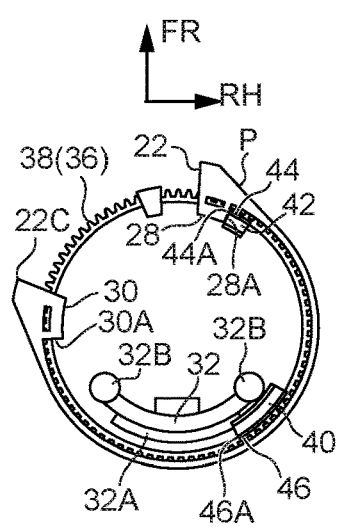
FIG. 6I shows a time when the knob is rotatingly driven from the "D" position to the "P" position.

At the time when the knob 22 is disposed from the "D" position to the "P" position, due to control of the control device 58, the motor 50 is driven forward, and the rotor cam 38 is rotated in the first direction from the reference position. Due thereto, the first entraining portion 44 (the first entraining surface 44A) of the rotor cam 38 entrains the first entrained portion 28 (the first entrained surface 28A) of the knob 22 in the first direction, and the knob 22 is rotated (returned) to the "P" position (refer to FIG. 6H and FIG. 6I).

Figure 6J:
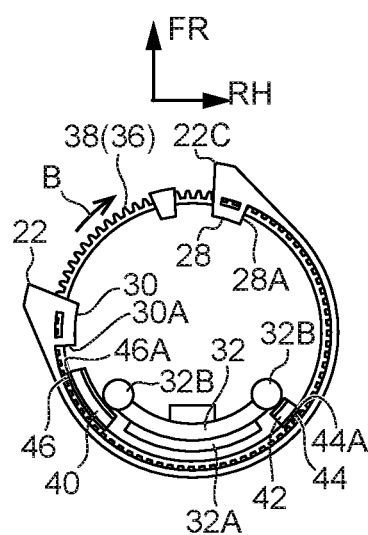
FIG. 6J shows a time when the knob is returned to the state of the start of driving.

At the time when the knob 22 is disposed at the "P" position (at the time when the printed circuit board 26 detects that the knob 22 is disposed at the "P" position), the motor 50 is driven reversely, and the rotor cam 38 is rotated in the second direction. Due thereto, the rotor cam 38 is rotated (returned) to the reference position (refer to FIG. 6J). At the time when the rotor cam 38 is disposed at the reference position (at the time when the printed circuit board 26 detects that the rotor cam 38 is disposed at the reference position), the reverse driving of the motor 50 is stopped, and the rotation of the rotor cam 38 in the second direction is stopped.

Here, due to the motor 50 being driven, the first entraining portion 44 (the first entraining surface 44A) of the rotor cam 38 entrains the first entrained portion 28 (the first entrained surface 28A) of the knob 22 and rotates the knob 22 in the first direction, and the second entraining portion 46 (the second entraining surface 46A) of the rotor cam 38 entrains the second entrained portion 30 (the second entrained surface 30A) of the knob 22 and rotates the knob 22 in the second direction. Therefore, the knob 22 can be rotated in the first direction and the second direction. Moreover, the knob 22 can be rotated in the first direction and the second direction merely by providing the first entraining portion 44 (the first entraining surface 44A) and the second entraining portion 46 (the second entraining surface 46A) at the rotor cam 38 and by providing the first entrained portion 28 (the first entrained surface 28A) and the second entrained portion 30 (the second entrained surface 30A) at the knob 22. Therefore, an increase in the number of parts of the shift device 10, and an enlargement of the build of the shift device 10, can be prevented.

Further, the first entraining portion 44 and the second entraining portion 46 are apart in the peripheral direction at the rear side of the rotor cam 38, and the first entraining portion 44 (the first entraining surface 44A) and the second entraining portion 46 (the second entraining surface 46A) are near to one another in the peripheral direction at the front side of the rotor cam 38 via the first entrained portion 28 (the first entrained surface 28A) and the second entrained portion 30 (the second entrained surface 30A) of the knob 22. Therefore, the first entraining portion 44 (the first entraining surface 44A) can be set near to the first entrained portion 28 (the first entrained surface 28A), and, due to the rotation of the rotor cam 38 in the first direction, the first entraining portion 44 (the first entraining surface 44A) can entrain the first entrained portion 28 (the first entrained surface 28A) at an early stage of the rotation of the rotor cam 38, and can rotate the knob 22 in the first direction at the early stage. Moreover, the second entraining portion 46 (the second entraining surface 46A) can be set near to the second entrained portion 30 (the second entrained surface 30A), and, due to the rotation of the rotor cam 38 in the second direction, the second entraining portion 46 (the second entraining surface 46A) can entrain the second entrained portion 30 (the second entrained surface 30A) at an early stage of the rotation of the rotor cam 38, and can rotate the knob 22 in the second direction at the early stage.

Moreover, the first entrained portion 28 and the second entrained portion 30 are apart in the peripheral direction at the front side of the knob 22, and the first entrained portion 28 (the first entrained surface 28A) and the second entrained portion 30 (the second entrained surface 30A) are near to one another in the peripheral direction at the rear side of the knob 22 via the first entraining portion 44 (the first entraining surface 44A) and the second entraining portion 46 (the second entraining surface 46A) of the rotor cam 38. Therefore, the first entraining portion 44 (the first entraining surface 44A) can be set near to the first entrained portion 28 (the first entrained surface 28A) even more, and, due to the rotation of the rotor cam 38 in the first direction, the first entraining portion 44 (the first entraining surface 44A) can entrain the first entrained portion 28 (the first entrained surface 28A) at an even earlier stage of the rotation of the rotor cam 38, and can rotate the knob 22 in the first direction at the even earlier stage. Moreover, the second entraining portion 46 (the second entraining surface 46A) can be set near to the second entrained portion 30 (the second entrained surface 30A) even more, and, due to the rotation of the rotor cam 38 in the second direction, the second entraining portion 46 (the second entraining surface 46A) can entrain the second entrained portion 30 (the second entrained surface 30A) at an even earlier stage of the rotation of the rotor cam 38, and can rotate the knob 22 in the second direction at the even earlier stage.

Further, at the time when the rotor cam 38 is not rotated by driving of the motor 50, due to the rotor cam 38 being disposed at the reference position, even if the knob 22 is rotatingly operated in a predetermined range (the range from the "P" position to the "M" position), the first entrained portion 28 (the first entrained surface 28A) and the second entrained portion 30 (the second entrained surface 30A) of the knob 22 do not interfere with the first entraining portion 44 (the first entraining surface 44A) and the second entraining portion 46 (the second entraining surface 46A) of the rotor cam 38, respectively. Therefore, the knob 22 applying a load to the entraining mechanism 36 can be prevented.

Moreover, after the rotor cam 38 is rotated in the first direction and the knob 22 is rotated in the first direction, due to the rotor cam 38 being rotated in the second direction and being disposed at the reference position, the second entraining portion 46 (the second entraining surface 46A) is near to the second entrained portion 30 (the second entrained surface 30A). Therefore, next, at the time when the rotor cam 38 is rotated in the second direction, the second entraining portion 46 (the second entraining surface 46A) can entrain the second entrained portion 30 (the second entrained surface 30A) at an early stage, and can rotate the knob 22 in the second direction at the early stage. Moreover, after the rotor cam 38 is rotated in the second direction and the knob 22 is rotated in the second direction, due to the rotor cam 38 being rotated in the first direction and being disposed at the reference position, the first entraining portion 44 (the first entraining surface 44A) is near to the first entrained portion 28 (the first entrained surface 28A). Therefore, next, when the rotor cam 38 is rotated in the first direction, the first entraining portion 44 (the first entraining surface 44A) can entrain the first entrained portion 28 (the first entrained surface 28A) at an early stage, and can rotate the knob 22 in the first direction at the early stage.

Further, in automatic parking of the vehicle, at the time when the rotor cam 38 rotates the knob 22 from the "P" position to the "D" position, the upper side portion of the second releasing portion 42 of the rotor cam 38 pushes the upper surface of the pushing plate 32A of the click body 32 toward the lower side, and moves click body 32 toward the lower side against the urging forces of the springs 34. Due thereto, the engagement (contact) of the click pins 32B with the click surface (the convex portions and concave portions) of the knob 22 is released (refer to FIG. 6B and FIG. 6C).

At the time when the rotor cam 38 rotates the knob 22 from the "D" position to the "R" position, the upper side portion of the first releasing portion 40 of the rotor cam 38 pushes the upper surface of the pushing plate 32A of the click body 32 toward the lower side, and moves the click body 32 toward the lower side against the urging forces of the springs 34. Due thereto, the engagement of the click pins 32B with the click surface is released (refer to FIG. 6D and FIG. 6E).

At the time when the rotor cam 38 rotates the knob 22 from the "R" position to the "D" position, the upper side portion of the second releasing portion 42 pushes the upper surface of the pushing plate 32A toward the lower side, and moves the click body 32 toward the lower side against the urging forces of the springs 34. Due thereto, the engagement of the click pins 32B with the click surface is released (refer to FIG. 6F and FIG. 6G).

At the time when the rotor cam 38 rotates the knob 22 from the "D" position to the "P" position, the upper side portion of the first releasing portion 40 pushes the upper surface of the pushing plate 32A toward the lower side, and moves the click body 32 toward the lower side against the urging forces of the springs 34. Due thereto, the engagement of the click pins 32B with the click surface is released (refer to FIG. 6H and FIG. 6I).

In this way, at the time when the rotor cam 38 rotates the knob 22 in the first direction and the second direction, the engagement of the click pins 32B with the click surface is released. Therefore, the rotor cam 38 rotating the knob 22 in the first direction and the second direction against the urging forces of the springs 34 can be reduced.

Moreover, the engagement of the click pins 32B with the click surface is released during the time from before the rotor cam 38 rotates the knob 22 in the first direction and the second direction until the rotation of the knob 22 by the rotor cam 38 in the first direction and the second direction ends. Therefore, the rotor cam 38 rotating the knob 22 in the first direction and the second direction against the urging forces of the springs 34 can be prevented effectively.

Further, the positions of the first entraining portion 44 and the second releasing portion 42 in the peripheral direction (rotating direction) of the rotor cam 38 overlap, and the first entraining portion 44 and the second releasing portion 42 are made integral. The positions of the second entraining portion 46 and the first releasing portion 40 in the peripheral direction of the rotor cam 38 overlap, and the first entraining portion 44 and the second releasing portion 42 are made integral. Therefore, the first entraining portion 44 and the second releasing portion 42 can reinforce one another, and the second entraining portion 46 and the first releasing portion 40 can reinforce one another, and the strengths of the first entraining portion 44, the second entraining portion 46, the first releasing portion 40 and the second releasing portion 42 can be improved.

Note that, in the present embodiment, the first entrained portion 28 and the second entrained portion 30 are apart in the peripheral direction of the knob 22. However, the first entrained portion 28 and the second entrained portion 30 may be connected integrally in the peripheral direction of the knob 22.

Moreover, in the present embodiment, the first entraining portion 44 and the second entraining portion 46 are apart in the peripheral direction of the rotor cam 38. However, the first entraining portion 44 and the second entraining portion 46 may be connected integrally in the peripheral direction of the rotor cam 38.

Further, in the present embodiment, the "M" position is included among the shift positions that the knob 22 can be rotatingly operated to. However, the "M" position does not have to be included among the shift positions that the knob 22 can be rotatingly operated to.

Moreover, in the present embodiment, in the automatic parking of the vehicle, the rotor cam 38 is rotated to the reference position at the time when the knob 22 is disposed from the "P" position and the "R" position to the "D" position, and at the time when the knob 22 is disposed from the "D" position to the "R" position. However, in the automatic parking of the vehicle, the rotor cam 38 does not have to be rotated to the reference position at the time when the knob 22 is disposed from the "P" position and the "R" position to the "D" position, and at the time when the knob 22 is disposed from the "D" position to the "R" position.

Further, in the present embodiment, the knob 22 is rotatingly operated in the first direction and the second direction.

However, by extending the knob 22 out in the radial direction and providing the operating portion so as to be able to rotate integrally therewith, the operating portion may be rotatingly operated, and the knob 22 rotated in the first direction and the second direction.

Moreover, in the present embodiment, the entraining mechanism 36 rotates the knob 22 in the first direction and the second direction at the time of automatic parking of the vehicle. However, the entraining mechanism 36 may rotate the knob 22 in the first direction and the second direction at the time of automatic driving (the time of automatic traveling) of the vehicle.

Further, in the present embodiment, the shift device 10 is set at the console. However, the shift device 10 may be set at an instrument panel or a steering column cover.

The disclosure of Japanese Patent Application No. 2017-169722 is, in its entirety, incorporated by reference into the present application.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A shift device for a vehicle, comprising:
   a shift body that is rotated in a predetermined range in a first direction and in a second direction that is a direction opposite from the first direction, and whose shift position is changed;
   a moving mechanism that has a moving member at which a first moving portion and a second moving portion are provided, the first moving portion moving the shift body in the first direction, and the second moving portion moving the shift body in the second direction, due to movement of the moving member;
   a first moved surface that is provided at the shift body, and that is moved in the first direction by the first moving portion;
   a second moved surface that is provided at the shift body, and that is moved in the second direction by the second moving portion,
   an urging member for urging the shift body in a rotation axial direction of the shift body;
   a first releasing portion that is provided at the moving member, and that, in a situation in which the first moving portion moves the shift body in the first direction, releases urging of the shift body by the urging member and the shift body and the urging member are apart from each other; and
   a second releasing portion that is provided at the moving member, and that, in a situation in which the second moving portion moves the shift body in the second direction, releases urging of the shift body by the urging member and the shift body and the urging member are apart from each other,
   wherein the first moved surface and the second moved surface are apart from one another along a peripheral direction of the shift body, and
   wherein the first moving portion and the second moving portion are disposed between the first moved surface and the second moved surface along the peripheral direction of the shift body and are apart from one another along the peripheral direction of the shift body.

2. The shift device for a vehicle of claim 1, wherein, due to the moving member being disposed at a reference position in a situation in which the moving member is not being moved, the shift body does not interfere with the first moving portion and the second moving portion in a situation in which the shift body is moved in the predetermined range.

3. The shift device for a vehicle of claim 2, wherein the moving member is moved to the reference position between a situation in which the first moving portion moves the shift body in the first direction, and a situation in which the second moving portion moves the shift body in the second direction.

4. The shift device for a vehicle of claim 1, wherein, before the first moving portion moves the shift body in the first direction, the first releasing portion starts releasing of the urging of the shift body by the urging member, and, before the second moving portion moves the shift body in the second direction, the second releasing portion starts releasing of the urging of the shift body by the urging member.

5. The shift device for a vehicle of claim 1, wherein positions of the first moving portion and the second releasing portion overlap in a moving direction of the moving member, and positions of the second moving portion and the first releasing portion overlap in the moving direction of the moving member.

6. The shift device for a vehicle of claim 1, wherein the first moving portion moves the shift body only in the first direction, and the second moving portion moves the shift body only in the second direction.

7. A shift device for a vehicle, comprising:
   a shift body that is rotated in a predetermined range in a first direction and in a second direction that is a direction opposite from the first direction, and whose shift position is changed;
   a moving mechanism that has a moving member at which a first moving portion and a second moving portion are provided, the first moving portion moving the shift body in the first direction, and the second moving portion moving the shift body in the second direction, due to movement of the moving member;
   a first moved surface that is provided at the shift body, and that is moved in the first direction by the first moving portion; and
   a second moved surface that is provided at the shift body, and that is moved in the second direction by the second moving portion,
   wherein the first moved surface and the second moved surface are apart from one another along a peripheral direction of the shift body,
   wherein the first moving portion and the second moving portion are disposed between the first moved surface and the second moved surface along the peripheral direction of the shift body and are apart from one another along the peripheral direction of the shift body,
   wherein due to the moving member being disposed at a reference position in a situation in which the moving member is not being moved, the first moved surface and the second moved surface of the shift body are configured to not contact the first moving portion and the second moving portion in a situation in which the shift body is moved in the predetermined range that includes a plurality of shift positions,
   wherein the moving member is moved to the reference position after the first moving portion moves the shift body in the first direction, and the moving member is moved to the reference position after the second moving portion moves the shift body in the second direction, and wherein either one contact between the first moving portion and the first moved surface or between the second moving portion and the second moved surface is configured to be continuously maintained in a case in which the shift body is rotated by the first moving portion or by the second moving portion from one shift position to another shift position.

8. The shift device for a vehicle of claim 7, comprising:
an urging member for urging the shift body;
a first releasing portion that is provided at the moving member, and that, in a situation in which the first moving portion moves the shift body in the first direction, releases urging of the shift body by the urging member; and
a second releasing portion that is provided at the moving member, and that, in a situation in which the second moving portion moves the shift body in the second direction, releases urging of the shift body by the urging member.

9. The shift device for a vehicle of claim 8, wherein, before the first moving portion moves the shift body in the first direction, the first releasing portion starts releasing of the urging of the shift body by the urging member, and, before the second moving portion moves the shift body in the second direction, the second releasing portion starts releasing of the urging of the shift body by the urging member.

10. The shift device for a vehicle of claim 8, wherein positions of the first moving portion and the second releasing portion overlap in a moving direction of the moving member, and positions of the second moving portion and the first releasing portion overlap in the moving direction of the moving member.

11. The shift device for a vehicle of claim 7, wherein the first moving portion moves the shift body only in the first direction, and the second moving portion moves the shift body only in the second direction.

12. The shift device for a vehicle of claim 7, wherein, in the situation in which the moving member is disposed at the reference position and is not being moved, and the shift body is moved in the predetermined range, a distance between the first moved surface and the first moving portion along the peripheral direction of the shift body is variable depending on the shift positions of the shift body, and a distance between the second moved surface and the second moving portion along the peripheral direction of the shift body varies depending on the shift positions of the shift body.

* * * * *